April 15, 1941.    A. C. AQUARA ET AL    2,238,150
CONE DIPPER
Filed May 8, 1940
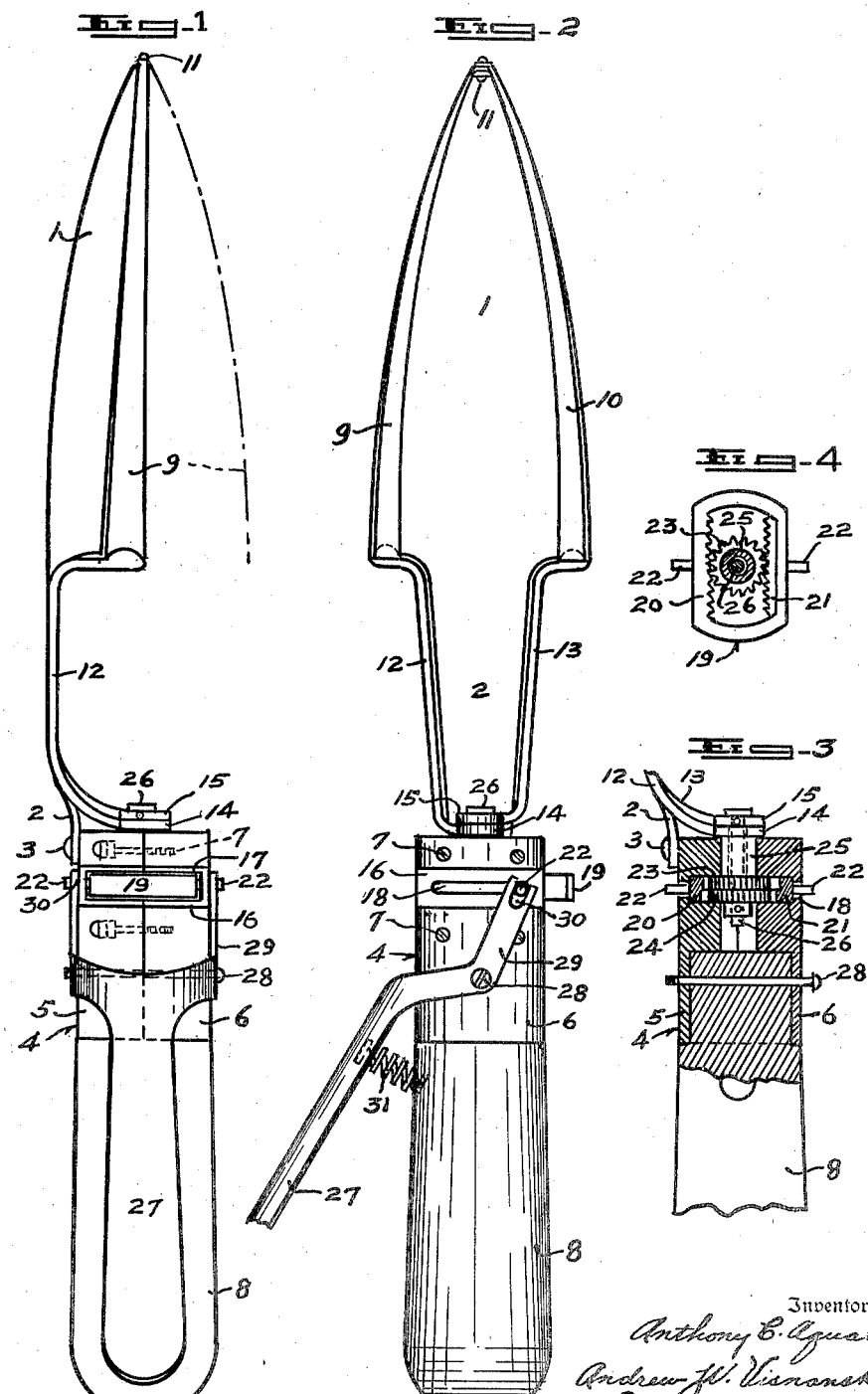
Inventor
Anthony C. Aquara
Andrew W. Visnansky
By Jas R Snyder
Attorney Patented Apr. 15, 1941

2,238,150

UNITED STATES PATENT OFFICE 2,238,150

CONE DIPPER

Anthony C. Aquara, Swissvale, and Andrew W. Visnansky, North Braddock, Pa.

Application May 8, 1940, Serial No. 334,024

1 Claim. (Cl. 107—48)

This invention relates to a dipper, and while primarily designed and intended for lading and shaping a portion of ice cream preparatory to placing the latter into an edible cone, it will be obvious that the device may be employed for any other purposes wherein it is found to be applicable.

Important objects and advantages of the invention are to provide a dipper of the character described, which may be conveniently manipulated for lading and shaping a portion of ice cream and for removing the latter therefrom, which will not compress the ice cream engaged thereby, which is simple in its construction and arrangement, durable and efficient in its use, positive in its action, compact, attractive in appearance, and comparatively economical in its manufacture and use.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is a side elevational view of a cone dipper, constructed in accordance with the invention, in the normal inoperative position.

Figure 2 is a front elevational view thereof.

Figure 3 is a fragmentary, side elevational view of the handle and associated parts, and being partly in cross section.

Figure 4 is a top plan view of the gear frame and gearing embodied in the operating mechanism of the device.

Referring in detail to the drawing 1 denotes an elongated, dished scoop member, which is segmental, cone-shaped to conform to the contour of approximately one-third equal part or less of a full cone, and terminating at its outer end in a relatively pointed structure.

The scoop member 1 is carried at the outer end of a supporting stem 2, which latter is preferably formed integral with the enlarged inner end of the former. The inner end of the stem is rigidly fixed by screws 3, welding, or in any other suitable manner, to a bearing ferrule 4. The latter comprises a pair of similar, complemental sections, respectively indicated at 5 and 6, which are separable and secured together by a plurality of screws 7. The bearing ferrule is secured to and forms a portion of the manipulating handle 8.

A pair of similar shaping blades, respectively indicated at 9 and 10, are normally disposed in the inoperative positions against respective side edges of the scoop member 1, and have converging outer ends, which are pivotally joined together with the pointed outer end of the scoop member by a common pivoting pin 11, as clearly illustrated in Figure 2.

The inner ends of the shaping blades 9 and 10 are permanently fixed to the outer ends of respective supporting shanks 12 and 13. The inner ends of the latter are formed to provide connecting disks, respectively indicated at 14 and 15. The connecting disks are disposed flatly against each other on the outer end of the bearing ferrule 4, with the disk 15 being positioned outwardly of the disk 14.

The bearing ferrule 4 is formed with a squared portion 16 disposed adjacent to the outer end of the former. A passage 17, having open ends, extends laterally through the portion 16, and the front and rear walls thereof are provided with elongated, parallel disposed slots 18.

A substantially rectangularly-shaped gear frame 19 is shiftably mounted in the passage 17, and embodies a rear gear rack 20 and a front gear rack 21. The gear racks extend parallel to and are spaced from each other, and are provided with fixed, centrally disposed connecting pins 22, which project through the slots 18 in respective front and rear walls of the passage 17.

A pair of pinions, respectively indicated at 23 and 24, are mounted in the passage 17 between the gear racks 20 and 21. The pinions are positioned flatly against each other, with the pinion 23 being disposed outwardly of the pinion 24. The gear racks 20 and 21 are so arranged and positioned that the teeth of the rear rack 20 mesh with the outer pinion 23, and the teeth of the front rack 21 mesh with the inner pinion 24.

A tubular bearing 25 is journaled for rotation in the outer end of the bearing ferrule 4, and is fixed to the outer pinion 23 and to the inner connecting disk 14. A short shaft 26 is journaled for rotation in the tubular bearing 25, and is fixed to the inner pinion 24 and to the outer disk 15.

An operating lever 27 is pivotally connected to the manipulating handle 8 by a bolt 28, which latter also extends through the bearing ferrule 4 and maintains the connection of said handle with the ferrule. The attached end of the operating lever is formed to provide a fork 29, which has bifurcated ends 30 engaging the respective connecting pins 22 of the gear frame 19. A spring 31 is disposed and engaged between the operating lever and the handle 8, and the normal action thereof returns and maintains the operating lever in the inoperative position spaced from the handle, as shown in Figure 2. When the lever is in such inoperative position, the shaping blades 9 and 10 are likewise disposed in the inoperative positions, and will be seated against the respective side edges of the interposed scoop member 1, as illustrated in Figures 1 and 2.

The shaping blades 9 and 10 are automatically returned to and maintained in the inoperative positions, against respective side edges of the scoop member 1, upon release of the operating lever 27, by the action of the spring 31. The action of the latter simply reverses the operating movements of the gear mechanism, and said spring is tensioned each time the shaping blades are shifted to the operative positions.

The scoop member 1 is laterally offset relatively to the axis of the handle 8, and the shanks 12 and 13, carrying respective blades 9 and 10, are so curved or shaped that, when the operating lever 27 is forced toward the handle, the gear mechanism will be operated to shift the blades toward each other in directions describing arcs complemental to the transverse peripheral curvature of the scoop member, as the latter and said blade connections have a common axial center. The blades are shiftable until they meet at the operative position diametrically opposed to the scoop member, as indicated in dot and dash lines in Figure 1.

To fill the improved cone dipper, the scoop member 1, with the blades in the inoperative positions, is forced into the mass of ice cream. The operating lever 27 is then manipulated to shift the blades until they meet each other at positions opposed to the scoop member, as above stated, whereby a definite portion of ice cream is detached from the mass and shaped into the form of a perfect cone. While still holding the blades in the operative positions, the device with the shaped portion of ice cream is withdrawn from the mass. The lever may now be released causing the blades to return automatically to the inoperative positions by the action of the spring 31. The edible cone, into which the shaped portion of ice cream is to be placed, is positioned against the base of the shaped ice cream, and the dipper is pulled downwardly, whereby the ice cream will be removed from the scoop member and deposited in the edible cone.

The length of the stem 2 and the length and contour of the shanks 12 and 13, together with the relative positions of the latter when the blades 9 and 10 are in the inoperative positions, provide ample clearance for conveniently transferring the shaped ice cream from the scoop member 1 to the edible cone, in the manner set forth.

It is obvious that the construction of the dipper device may be varied without departing from the principle or sacrificing any advantages of the invention. For instance, the gear racks 20 and 21 may be constructed in separate sections operable when shifted to rotate the associated pinions 23 and 24 in opposite directions and thereby shift the blades 9 and 10 to the operative positions in the manner herein before described.

The present invention provides a durable and most efficient device of its kind, which is sanitary, conveniently operable, and particularly economical in its use, as the portion of ice cream engaged and shaped thereby is in no way compressed by the scooping and shaping operations, but maintains the consistency of the mass of ice cream from which it is removed.

What we claim is:

A cone dipper of the character described comprising the combination of a manipulating handle, a segmental cone-shaped scoop member attached to said handle, a pair of shaping blades pivotally connected with said handle and having a common pivotal connection with said member, said blades being normally disposed against the respective side edges of said member, a gear mechanism mounted in said handle operable for simultaneously shifting said blades in opposite directions relatively to each other, manually operated means for actuating said mechanism to shift said blades to positions opposed to said member, and automatically operable means for actuating said mechanism to return said blades to the normal positions against the side edges of said member.

ANTHONY C. AQUARA.
ANDREW W. VISNANSKY.